C. W. HULL.
FARM TRACTOR.
APPLICATION FILED APR. 6, 1912.
1,122,934.
Patented Dec. 29, 1914.
2 SHEETS—SHEET 1.
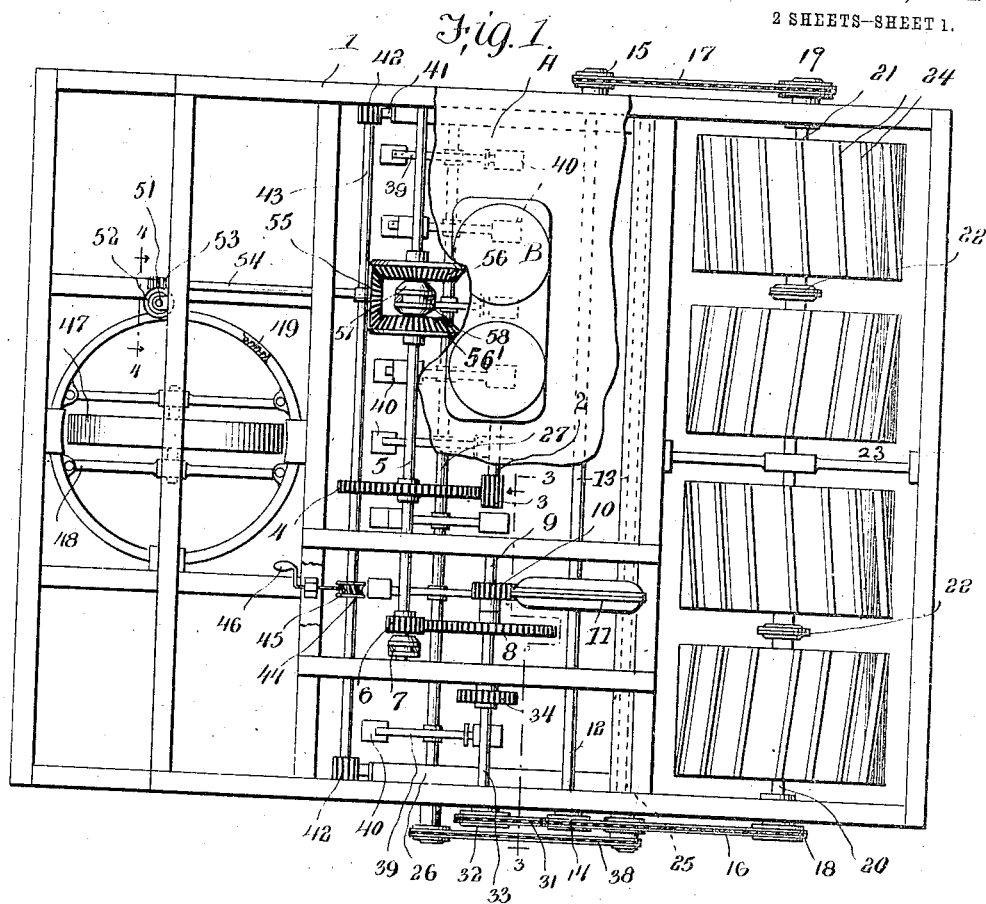
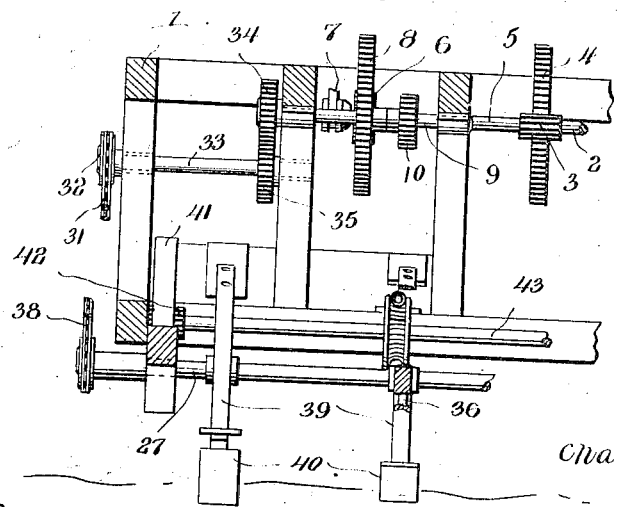
Witnesses
William Smith
H. Dittman
Inventor
Charles W. Hull.
By Victor J. Evans
Attorney C. W. HULL.
FARM TRACTOR.
APPLICATION FILED APR. 6, 1912.
1,122,934.
Patented Dec. 29, 1914.
2 SHEETS—SHEET 2.
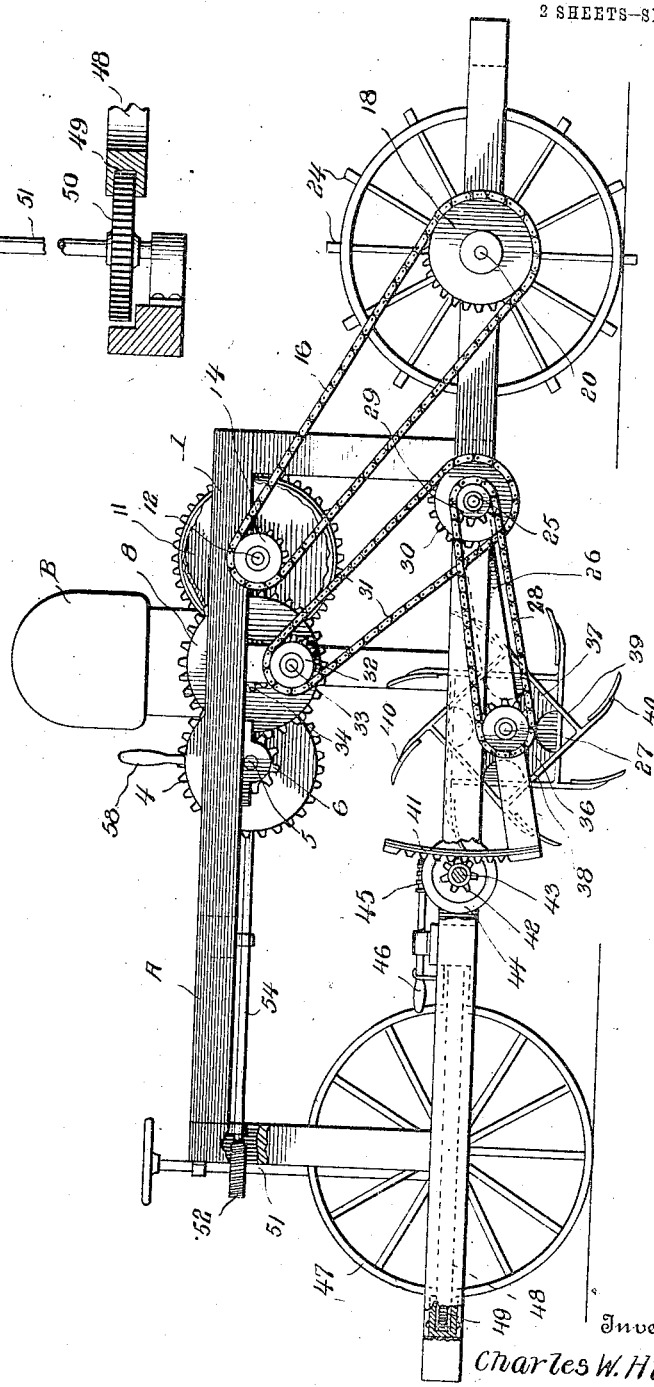
Witnesses
William Smith
Inventor
Charles W. Hull.
By Victor J. Evans
Attorney

UNITED STATES PATENT OFFICE.

CHARLES W. HULL, OF WHEELER, WASHINGTON.

FARM-TRACTOR.

1,122,934. Specification of Letters Patent. Patented Dec. 29, 1914.

Application filed April 6, 1912. Serial No. 689,018.

*To all whom it may concern:*

Be it known that I, CHARLES W. HULL, a citizen of the United States, residing at Wheeler, in the county of Grant and State of Washington, have invented new and useful Improvements in Farm-Tractors, of which the following is a specification.

This invention relates to farm tractors for operating plows and for other like purposes, and it has for its object to produce a machine of this class which shall be simple in construction and efficient in operation.

In the drawing,—Figure 1 is a top plan view of a machine constructed in accordance with the invention. Fig. 2 is a side elevation. Fig. 3 is a transverse vertical sectional view taken on line 3—3 in Fig. 1. Fig. 4 is a sectional detail view.

Corresponding parts in the several figures are denoted by like characters of reference.

The frame structure A of the improved machine is provided with a platform 1 on which an engine or motor B of any suitable type is supported. The motor has a driven shaft 2 provided with a pinion 3 meshing with a spur wheel 4 on a shaft 5 carrying a pinion 6 which is connected therewith by a friction clutch 7 so as to rotate with the shaft when the latter is rotated in one direction. The pinion 6 meshes with a spur wheel 8 on a counter shaft 9 which carries also a pinion 10. The pinion 10 serves to transmit motion through a differential gear 11 to the shafts 12 and 13 which are provided with sprocket wheels 14, 15 from which motion is transmitted by chains or link belts 16, 17 to sprocket wheels 18, 19 on the wheel carrying shafts or axles 20, 21 which are supported in axial alinement in suitable bearings on the frame. Each of the shafts or axle members 20, 21 is divided about midway of its length and is equipped with a differential gear 22, thereby driving the transporting and propulsion wheels 23 at differential speed for convenience in turning the machine. The transporting and propulsion wheels are made of considerable width and are provided with radially extending earth engaging grouts 24 placed diagonally thereon and serving not only to insure the effective propulsion of the machine, but also to cut and pack the sub-soil.

A shaft 25 which is supported transversely of the frame structure A carries a swinging frame 26 upon which the earth engaging devices of the machine are mounted. Said frame 26 supports a shaft 27 which receives motion through a chain or link belt 28 from a sprocket 29 on the shaft 25, said sprocket 29 being associated with another sprocket wheel 30 which receives motion by a chain 31 from a sprocket wheel 32 on a shaft 33 which is connected by intermeshing gears 34, 35 with the shaft 9 from which is receives motion, said motion being transmitted by the means just described to the shaft 27. The latter carries a plurality of castings 36 having radially extending arms or spokes 37 with flat faces 38 on which plates 39 are mounted, said plates being provided at intervals with earth engaging blades 40 which, when the shaft 27 is in motion and the machine is moving over the field, will be adapted to engage the soil, loosening, breaking and agitating the same to prepare it for the reception of seed.

The swinging frame 26 is provided at the corners adjacent to the free edge thereof with upwardly extending rack bars 41 which are guided in engagement with pinions 42 on a shaft 43, said shaft having a worm gear 44 meshing with a suitably supported worm 45 with which is associated a crank 46, whereby it may be manipulated for the purpose of turning the worm carrying shaft 43, thereby raising or lowering the free end of the frame 26 and effecting vertical adjustment of the earth engaging elements carried by said frame. In this simple manner the earth engaging elements may be thrown into or out of earth engaging position and may be set to engage the earth at the requisite depth or may be supported for transportation above and out of engagement with the surface of the soil.

For the purpose of steering the improved machine, a steering wheel 47 is provided, the same being supported by means of a turn table 48 including a circumferential toothed wheel 49 which is in mesh with a pinion 50 on a shaft 51 having a worm gear 52 meshing with a worm 53 on one end of a shaft 54 carrying at its other end a bevel pinion 55 meshing with opposed bevel gears 56, 56' which are loosely mounted on the shaft 5, said shaft carrying also a clutch member 57 which is slidably supported between the bevel gears 56, 56', either of which may be engaged by said clutch member for the purpose of connecting it for rotation with the shaft 5, as will be readily understood. By placing the clutch member 57 in a position intermediate the bevel gears 56, 56' and out of engagement with either one, the said bevel gears will remain idle on the shaft when the latter rotates. The clutch member 57 may be actuated by means of a hand lever 58. It will be readily seen that the turn table carrying the steering wheel may be turned in either direction by the mechanism just described, thus enabling the machine to be conveniently steered. When the machine moves in the proper direction, the clutch member 57 is placed in a non-engaging position with reference to the bevel gears 56, 56' which will thus remain idle.

From the foregoing description, taken in connection with the drawings hereto annexed, the operation and advantages of this invention will be readily understood by those skilled in the art to which it appertains.

The construction of the improved machine is simple and inexpensive, and it will be found thoroughly efficient for the purposes for which it is provided.

Having thus described the invention, what is claimed as new, is:—

A farm tractor comprising a frame structure of rectangular shape provided at its forward end with bearings for two alining axle members, two axle members supported for rotation in said bearings, each of said axle members including two shaft members and a differential gear, transporting wheels mounted on the individual shaft members and associated with the differential gears, a turn table supported on the rearward part of the frame structure, a ground engaging steering wheel carried by the turn table, uprights rising from the frame, a second frame supported by said uprights above the first mentioned frame, said superposed frame having a platform and a motor supported thereon, means for transmitting motion from the motor to the turn table carrying the steering wheel, means for controlling said transmission means, and means for transmitting motion from the motor to the axle members carrying the transporting wheels including a train of gears, a differential gear, shafts associated with and driven by said differential gear, and chains transmitting motion from the last mentioned shafts to the axle members.

In testimony whereof I affix my signature in presence of two witnesses.

CHARLES W. HULL.

Witnesses:
D. R. PARLETTE,
MYRTLE L. HULL.